(12) United States Patent
Leung (10) Patent No.: US 11,214,501 B2
(45) Date of Patent: Jan. 4, 2022

(54) COMBINED ELECTROCHEMICAL IMPINGING STREAM REACTION APPARATUS

(71) Applicant: Wai On Leung, Hong Kong (HK)

(72) Inventor: Wai On Leung, Hong Kong (HK)

( * ) Notice: Subject to any disclaimer, the term of this patent is extended or adjusted under 35 U.S.C. 154(b) by 34 days.

(21) Appl. No.: 16/164,793

(22) Filed: Oct. 19, 2018

(65) Prior Publication Data

US 2020/0123026 A1    Apr. 23, 2020

(51) Int. Cl.
*C02F 1/463*    (2006.01)
*C02F 1/461*    (2006.01)

(52) U.S. Cl.
CPC .......... *C02F 1/463* (2013.01); *C02F 1/46109* (2013.01); *C02F 2201/4611* (2013.01); *C02F 2201/4618* (2013.01); *C02F 2201/46145* (2013.01)

(58) Field of Classification Search
CPC .................. C02F 1/463; C02F 1/46109; C02F 2201/4611; C02F 2201/46145
See application file for complete search history.

(56) References Cited

U.S. PATENT DOCUMENTS

| | | | | |
|---|---|---|---|---|
| 6,238,546 B1* | 5/2001 | Knieper | ............. | C02F 1/46104 204/269 |
| 2014/0116942 A1* | 5/2014 | Gordon | ................... | C02F 1/463 210/638 |
| 2016/0045841 A1* | 2/2016 | Kaplan | ................... | C01B 32/21 429/49 |
| 2018/0327286 A1* | 11/2018 | Lopez | ................... | C02F 1/4618 |

* cited by examiner

*Primary Examiner* — Ryan A Reis (57) ABSTRACT

Disclosure is combined electrochemical impinging stream reaction apparatus with addition of ultrasonic of the invention and is used for illustrating the structure and the mutual position relationship of components of the apparatus. The combined electrochemical impinging stream reaction apparatus with addition of ultrasonic comprises a container frame to hold all the components, an electrocoagulation unit which is attached to the hopper type casing. The hopper type casing contains a conical filter arrangement. The combined electrochemical impinging stream reaction apparatus is configured for the removal of contaminants from water and wastewater.

18 Claims, 8 Drawing Sheets

COMBINED ELECTROCHEMICAL IMPINGING STREAM REACTION APPARATUS

TECHNICAL FIELD

The invention relates to a filtration apparatus, and particularly to a combined electrochemical impinging stream reaction apparatus for removal of contaminants from water and wastewater.

BACKGROUND

The chemical or electrochemical water and wastewater treatment systems previously used required many container tanks worth of space, lots of motors, water pumps, chemicals, and often failed to meet the increasingly upgraded environment protection needs and barely met potable water standards. The process was overall a very difficult process to manage. The operation of such apparatuses required skilled labor. Thus, there is great need of a water and wastewater treatment apparatus which is simple in structure (preferably minimal moving parts), low in cost, small in volume and easy to operate. The previous model for wastewater treatment as titled "Vortex Sewage Disposal Apparatus" required heavy chemical dosing for the coagulation and flocculation process. Thus, there is a great need for a water and wastewater treatment apparatus which is cost saving, simple in structure, less expensive, easy to operate and use, minimal usage of chemicals, can achieve higher degree of separation of oily water and silt with more oxygen content in treated water.

SUMMARY

The objective of the present invention is to provide an electrocoagulation environment followed by impinging stream reaction with ultrasonic for water and wastewater treatment; which uses minimal (or even zero) chemicals to treat and is capable of separating oil, heavy metal, organic matters and silt, with both the separation effect and maintaining quality in water to meet the minimum requirement by environment protection in the most stringent countries.

To achieve the objective of the present invention, there is provided an electrocoagulation impinging stream reaction apparatus with the addition of ultrasonic. The apparatus comprises of two sections 1) a covered electrocoagulation cell with an impinging nozzle on top, an input for ultrasonic, a hatch cover to monitor the vertically placed electrode plates, and a mounted inlet pipe at the base allowing for up flow of water through the cell. The back wall of the electrocoagulation cell contains an impinging nozzle which is connected to 2) a hopper-type casing with a discharge tray, stacked conical filters, a round base plate and a lower outlet. The effluent discharge tray is placed across the diameter of the hopper-case; it contains a cut circular center where there is provided a metallic ring with stadium shaped holes to fit in the conical filter. Each conical filter has an extended ring at the smaller circumference edge containing stadium shaped holes to connect to other conical filters. The base plate carries the conical filters and is attached to the discharge tray with ribbed rods, and nuts and bolts joining the edges. There is provided a top baffle plate covering part of the hopper casing which force the accumulated oil and grease to move to the side that is not covered for collection discharge through the skimmer present on that side. The silt and other sediment are discharged through the lower outlet, and clear water ascents through the conical filters to the effluent discharge tray, reaching the clear water effluent tank where the clear water will be discharged through the water discharging pipe connected.

The advantages of the apparatus of the present invention lie in that it ensures that the wastewater meets the requirements of environment protection standards, and the apparatus does not require too many motors, utilizes minimal chemical re-agents, simple in structure and convenient to operate.

BRIEF DESCRIPTION OF THE DRAWINGS

The embodiments of the present invention will be described below in connection with accompanying drawings in which.

DESCRIPTION OF THE EMBODIMENTS

Figure 1:
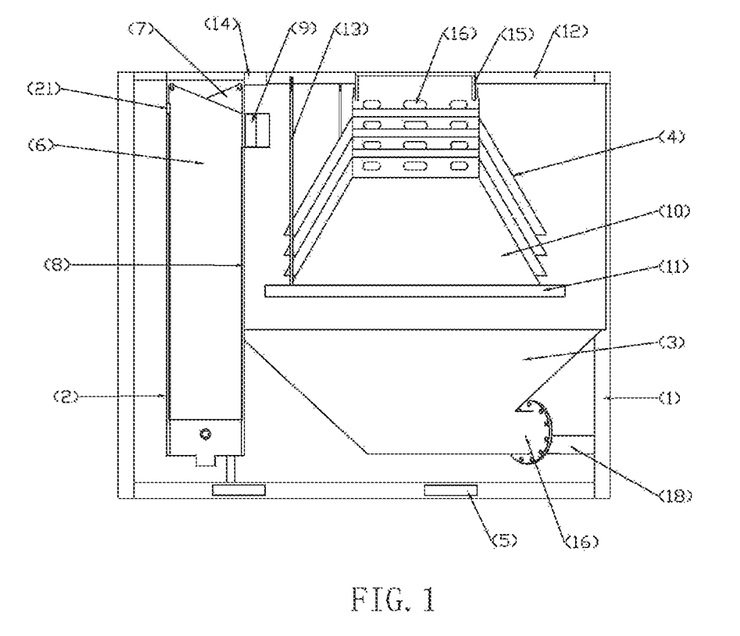
FIG. 1 is a sectional view (A-A sectional marking shown in FIG. 3) showing the structure of an embodiment of the combined electrochemical impinging stream reaction apparatus with addition of ultrasonic according to the invention.

FIG. 1 is a sectional view of an embodiment of the combined electrochemical impinging stream reaction apparatus with addition of ultrasonic of the invention and is used for illustrating the structure and the mutual position relationship of components of the apparatus. The combined electrochemical impinging stream reaction apparatus with addition of ultrasonic comprises a container frame 1 to hold all the components, an electrocoagulation unit 2 which is attached to the hopper type casing 3. The hopper type casing contains a conical filter arrangement 4. The container frame 1 has two forklift handles 5 at the base of the frame as shown in the diagram.

Inside the walls of the rectangular electrocoagulation cell 2, there are replaceable electrode plates 6 and 7. The electrocoagulation unit 2 shares a wall 8 with the hopper type casing 3 and this wall 8 contains an impinging nozzle 9 close to the top of the hopper type casing 3.

The upper portion of the hopper type casing 3 is a hollow cylindrical configuration and the lower portion has a hopper configuration. As shown in FIG. 1, the electrocoagulation cell 2 is positioned on the left of the hopper type casing 3.

Inside the hopper type casing 3 is the conical filter arrangement 4 consisting of a series of stacked conical filters 10 supported by a base ring 11. The base ring 11 is connected to a discharge tray 12 with supporting rods 13. This arrangement 4 of stacked conical filters is supported within the hopper type casing 3 with a discharge tray support 14. The discharge tray contains an inward protruding metallic ring 15 to connect to the top conical filter 10. The conical filters 10 contain stadium shaped holes 16 to allow water to flow through it.

The lower portion of the hopper type casing 3 contains a sludge disposal outlet 17 which continues to a smaller diameter sludge disposal pipe 18.

Water flows upwards in the electrocoagulation unit 2 as the inlet pipe 19 (shown in FIG. 2) is positioned on the bottom half of the unit. The water does not fill to the top in the electrocoagulation unit 2 as it flows into the hopper type casing 3 through the impinging nozzle 9. The top of the electrode plates 6 and 7 stay dry and electrical connections are made here with cables 20 (shown in FIG. 2) passing through the wall opening for wire 21 on the front side of the electrocoagulation unit 2.

Inside the hopper type casing 3, the water flows in a downward circular motion around the conical filters 10 and reaches the center through the stadium shaped holes 16. It then rises to the top of the discharge tray 12 which guides the water to the effluent tank 19 (shown in FIG. 3). Simultaneously, the heavier sludge drops to the bottom of the hopper case 3 and is guided out of the hopper case through the sludge disposal outlet 17 and the sludge disposal pipe 18.

Figure 2:
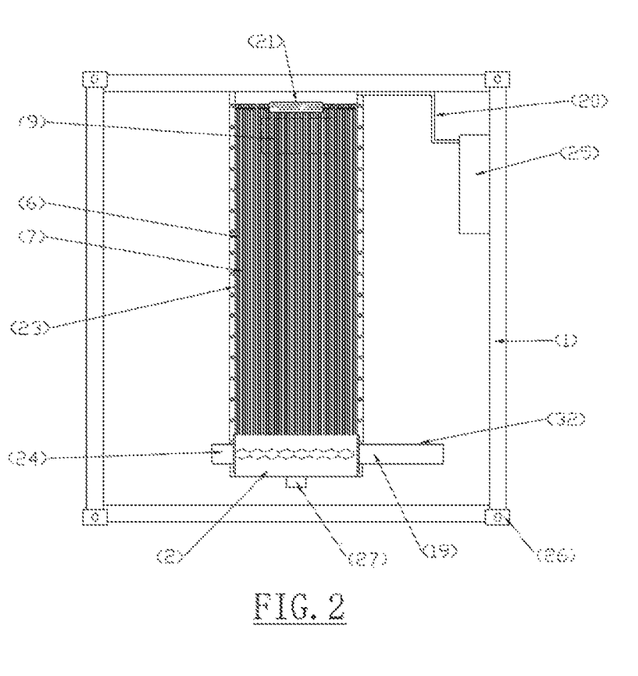
FIG. 2 is the front side view illustrating the position of the electrocoagulation unit in the combined electrochemical electrocoagulation impinging stream reaction apparatus shown in FIG. 1.

In FIG. 2, the front view of the combined electrochemical impinging stream reaction apparatus of the present innovation can be seen within the container frame 1. The front wall 23 of the electrocoagulation unit 2 is transparent so the parallel placed electrode plates 6 and 7 can be easily seen from the front. The T-shaped inlet pipe 19 located at the bottom half of the electrocoagulation unit 2 with a chemical injection port 32 at the turning corner of the T-shaped elbow joint. The change of water direction in the pipe creates turbulence in the water and allow thorough mixing of the dosed chemical (if necessary) and wastewater without the need of any mixer or stirrer. The wastewater enters the unit from the right-hand side as shown. The ultrasonic 24 is also located on the bottom half of the electrocoagulation unit 2, opposite to the inlet pipe 19 as shown in the figure. Behind the electrode plates 6 and 7, the impinging nozzle 9 is located on the top half of the rounded shared wall 8 leaving some space on the top of the electrocoagulation cell 2. The wall opening for wire 21 is above the impinging nozzle 9 on the transparent front wall 23 of the electrocoagulation unit 2.

On the right-side wall of the container frame 1, there is a control panel 25 to manage the operation of the electrocoagulation unit 2 and the flow of water through the system. The container frame 1 also contains frame connectors 26 on all the corners of the frame. A sludge removal opening 27 is located at the middle of the bottom of the electrocoagulation unit 2.

Figure 3:
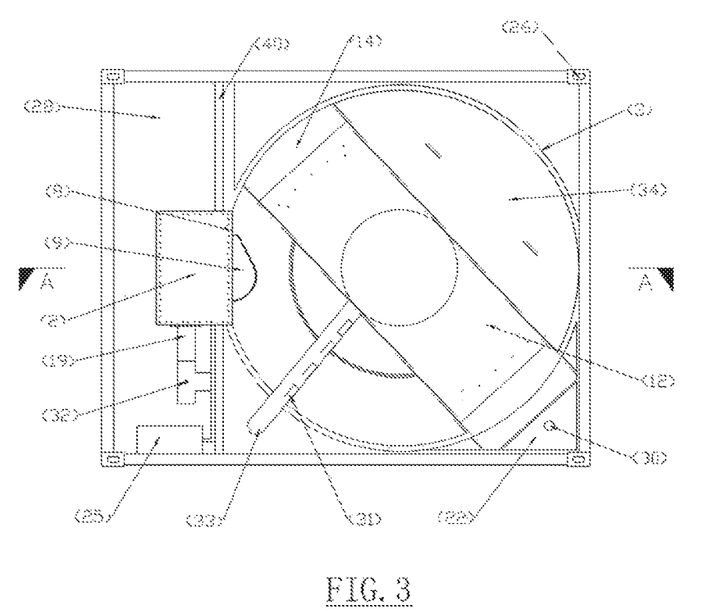
FIG. 3 is the top view of the combined electrochemical impinging stream reaction apparatus shown in FIG. 1.

Referring to FIG. 3 which shows the combined electrochemical impinging stream reaction apparatus with the addition of ultrasonic of the present invention in top view, there can be seen the arrangement and relative positions of components. The hopper casing 3 is circular in shape from this point of view; the rectangular electrocoagulation cell 2 shares a curved shared wall 8 with the hopper case 3 through which the water flows in through the impinging nozzle 9. The inlet pipe 19 attaches to the electrocoagulation cell 2 from the right-hand side with a chemical injection port 32 located on the T-shaped elbow joint. There is a partition wall 40 that creates a distinct chamber called the preparation chamber 28 which is where the electrocoagulation unit and control panel 25 are placed.

The discharge tray 12 stretches across the diameter of the hopper case 3 and is at a 45-degree angle clockwise from the centerline as marked by the sectional line A-A. The discharge tray 12 is supported by discharge tray supports 14. The discharge tray 12 has a cut in the center with a metallic ring connector 15 (not shown in this figure) attached to it. The water rises up from the hopper case 3 to the discharge tray 12 through this cut.

One of the discharge tray supports continues beyond the hopper case 3 and leads to an effluent tank 22 while the other end is blocked by the rounded wall of the hopper case 3. The effluent tank 22 is positioned on the top front right corner of the container frame. The effluent tank 22 contains an effluent outlet 29 (shown in FIG. 4) and a sediment disposal point 30 on its sloped base (shown in FIG. 4).

A slotted tube 31 is placed as an extension of the discharge tray on the side closer to the electrocoagulation unit. This slotted tube 31 is attached to the midpoint of the edge of the discharge tray with a blank side and can be rotated along the axis. The other end of the slotted tube 31 connects to the oil and scum discharge pipe 33 which is located in the corner of the frame opposite to the effluent tank 22 as shown in the FIG. 3.

The slotted tube 31 is rotated along its axis and gathers the oil that floats on top of the hopper case 3. A half of the hopper casing 3 is covered with a baffle plate 34 to guide the flow of accumulated oil around the hopper case 3 towards the slotted tube 31.

The frame connectors 26 are on all the corners of the container frame 1 to enable it to be secured easily to cranes and other containers.

Figure 4:
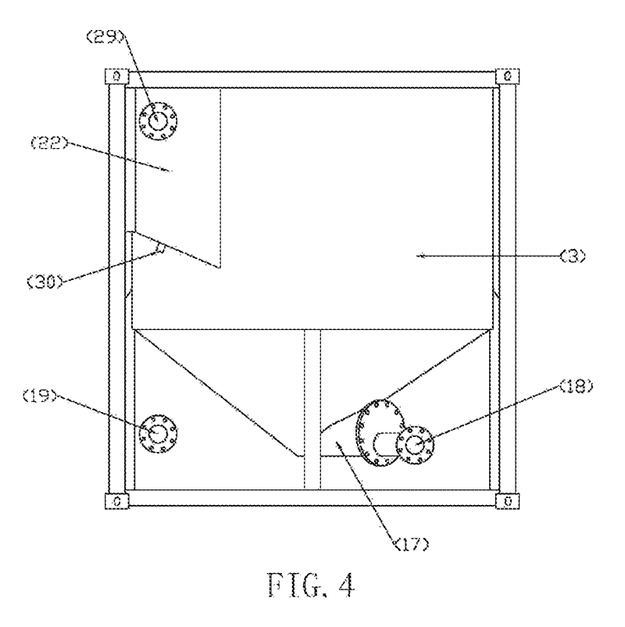
FIG. 4 is a back side view of the combined electrochemical impinging stream reaction apparatus illustrating the effluent and influent pipe locations.

FIG. 4 shows the back-side view of the combined electrochemical impinging stream reaction apparatus. The effluent tank 22 is on the top left corner of the container frame 1 from this view. The effluent outlet 29 is on this tank and allows the flow of clean water out of the system. The base of the effluent tank 22 is sloped and contains a sediment disposal point 30 to clean sediments that might settle here from time to time. On the bottom left is the mouth of the inlet pipe 19. The inlet pipe 19 starts on the backside (as shown), extends across below the hopper case 3 and bends to an T-shape before entering the electrocoagulation unit 2. On the bottom right, the sludge disposal outlet 17 from the base of the hopper case 3 and the connected sludge pipe 18 can be seen.

Figure 5A:
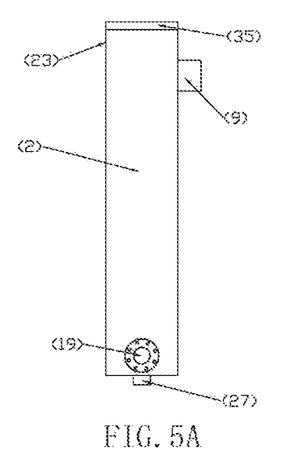
FIGS. 5A-5C is a right side view of the electrocoagulation unit illustrating the arrangement of the electrode plates inside the unit and the shape of the electrode plates.
Figures 5B, 5C:
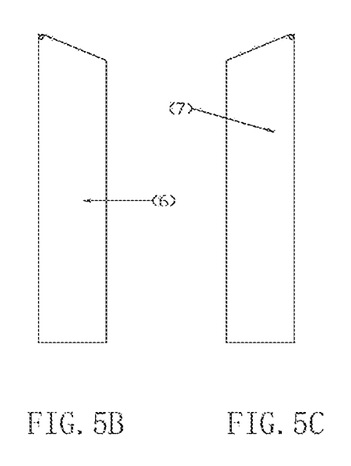

FIG. 5A-5C shows the right-hand side view of the electrocoagulation cell 2 and the shape of the electrode plates 6 and 7 in the electrocoagulation cell 2. The electrode plates 6 and 7 are placed parallel to each other and perpendicular to the transparent front wall 23 of the electrocoagulation cell 2 (as shown in FIG. 1).

Water enters the electrocoagulation unit 2 through the inlet pipe 19 at the bottom of the unit 2 as shown in the figure. The sludge removal opening 27 are located below the electrocoagulation unit 2 to remove any sediment settled during the electrocoagulation process. The impinging nozzle 9 is connected to the top of the electrocoagulation unit 2.

The electrode plates 6 and 7 are in the shape of a trapezoid where one of the non-parallel sides are perpendicular to the parallel side and the other edge is at an angle of 30-degrees. Electrode plates 6 are the anode while electrode plates 7 are the cathode. They are arranged alternately with the angled edge towards the top. The electrode plates 6 and 7 are connected to the control panel 25 (shown in FIG. 2) through the cables 20 and the wall opening for wires 21 that provides electricity for the electrocoagulation process. The plates will erode away with time and will need to be replaced eventually with new ones. A removable electrocoagulation unit cover 35 has been installed on top of the electrocoagulation cell 2 to enable the replacement and connection of electrode plates 6 and 7.

Figure 6A:
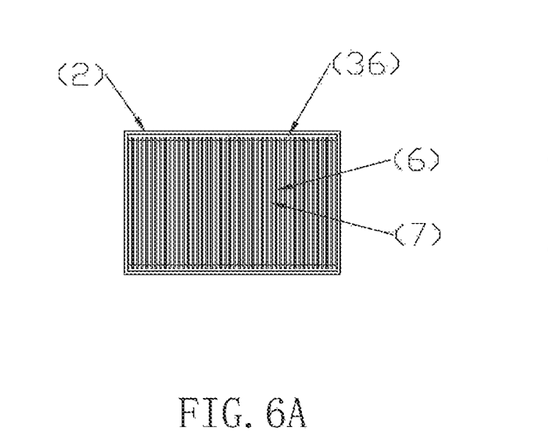
FIGS. 6A-6B are the top view of the electrocoagulation unit showing the arrangement of electrode plates and the shape of the electrode spacers inside the electrocoagulation unit.
Figure 6B:
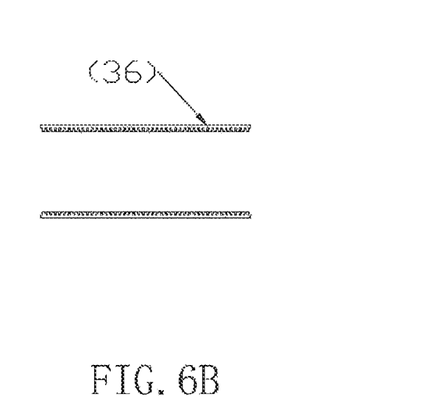

FIG. 6A-6B illustrate the electrocoagulation unit 2 from the top view (without the removal cover 35), showing the shape and arrangement of the electrode plate spacers 36 inside the unit 2. Electrode plates 6 and 7 are equally spaced within the electrocoagulation unit 2, fixed in their designated position by the electrode plates spacers 36 located on the top and bottom sides (from this view angle) electrocoagulation unit 2.

Figure 7A:
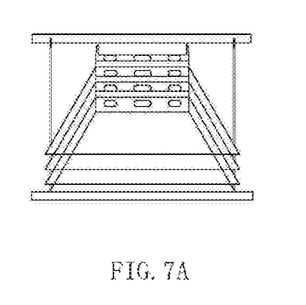
FIGS. 7A-7B are the schematic views showing the structure of a conical filter arrangement in the combined electrochemical impinging stream reaction apparatus shown in FIG. 1.
Figure 7B:
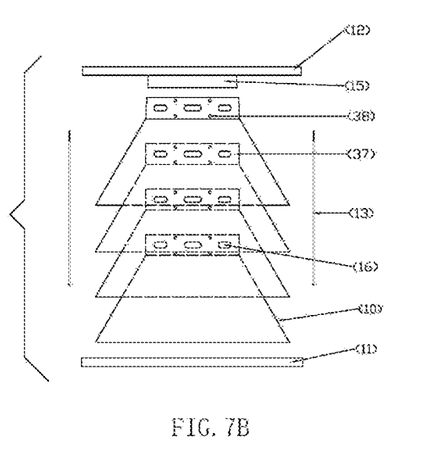

FIG. 7A-7B refers to the conical filter arrangement 4 within the electrocoagulation impinging stream reaction apparatus shown in FIG. 1. The conical filter arrangement 4 comprises of one discharge tray 12 with an attached metallic ring connector 15, up to four conical filters 10, four supporting rods 13 and one circular base ring 11.

Each conical filter 10 is made of plastic and has a conical surface with an extended cylindrical ring 37 on the smaller circumference of the conical filter 10. The angle of the inclined edge of each conical filter 10 is 30° away from the vertical edge of the extended cylindrical ring 37. On the extended cylindrical ring 37, there are stadium shaped holes 16 to allow water to flow through. The extended ring 37 also contains some smaller holes 38 around the stadium shaped holes 16 for bolts. The bolts allow the conical filters 10 to be stacked into a pile. The top-most conical filter 10 is then attached to the metallic ring connector 15 which is part of the discharge tray 12.

In addition to the connection at the metallic ring 15 of the discharge tray 12, the stacked conical filters 10 are supported by the circular base ring 11 which contains four small extensions 39 (shown in FIG. 8) to attach the supporting rods 18.

FIG. 7A further clearly illustrates the arrangement of the conical filter 4 as a whole. The stacked conical filters 10 are supported by the circular base ring 11 which connects to the discharge tray 12 with supporting rods 13. Water flows through the gaps between the conical filters and ascents to the mouth of the circular cut on the discharge tray 12.

Figure 8:
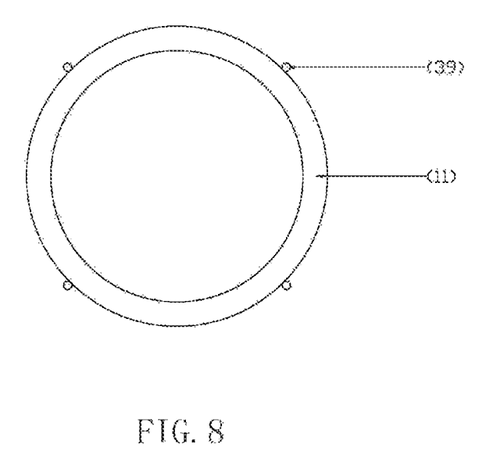
FIG. 8 is the top view of conical filter base ring.

Referring FIG. 8 which is a top view showing an embodiment of the circular base ring 11 and the four small extensions with holes 39. The circular base ring 11 acts as a support to the conical filters 10. The four small extensions with holes 39 are to screw in the supporting rods 13 on one side. The other side of the supporting rods 13 are screwed into the discharge tray 12. The center of the circular base ring is hollow to allow the flow of water.

What is claimed is:

1. An apparatus, comprising:
    a container frame;
    an electrocoagulation unit; wherein the electrocoagulation unit comprises an inlet pipe positioned on a bottom half of the electrocoagulation unit, a first electrode plate and a second electrode plate alternatively arranged inside the electrocoagulation unit, and an impinging nozzle attached to a top half of the electrocoagulation unit and in communication with an inside of the electrocoagulation unit;
    a conical filter arrangement adjacent to the impinging nozzle; and
    a hopper casing beneath the conical filter arrangement;
    wherein the inlet pipe is configured for introducing an untreated wastewater into the electrocoagulation unit, so that the untreated wastewater is treated by the first electrode plate and second electrode plate;
    the impinging nozzle is configured for injecting a water flow of the wastewater into the circumference of the conical filter arrangement along a tangential direction, so that the water flow is rotated along the circumference of the circular hopper casing and gradually towards a central axis of the conical filter arrangement.

2. The apparatus of claim 1, wherein the container frame further comprises a discharge tray on a top thereof; the discharge tray is supported by a discharge tray support that is secured on the top of the container frame.

3. The apparatus of claim 2, wherein the conical filter arrangement comprises a plurality of conical filters; the conical filters are stacked along a vertical direction, and supported by a base ring; the base ring is anchored to the discharge tray via at least four supporting rods.

4. The apparatus of claim 1, wherein the container frame further comprises two forklift handles disposed at a base thereof.

5. The apparatus of claim 2, wherein the discharge tray covers the conical filter arrangement from the top and comprises a mouth in communication with an inner space of the conical filter arrangement;
    the conical filter arrangement comprises a plurality of stadium-shaped holes at a top of the conical filter arrangement, so that the water flow rotated along the circumference is guided through and towards the inner space of the conical filter arrangement, and ends up to the discharge tray.

6. The apparatus of claim 1, wherein a shared wall is arranged between the electrocoagulation unit and the conical filter arrangement, and the impinging nozzle is extended through the shared wall from a preparation chamber where the electrocoagulation unit is placed.

7. The apparatus of claim 1, wherein the hopper casing containing the conical filter arrangement on the top part comprises a sludge disposal outlet which continues a sludge disposal pipe, for allowing sludge separated from the wastewater injected into the conical filter arrangement to be guided out.

8. The apparatus of claim 1, wherein an electrode plate spacer is arranged inside the electrocoagulation unit and is configured for designating positions for the first electrode plate and the second electrode plate.

9. The apparatus of claim 1, wherein the first electrode plate and the second electrode plate are connected by wires and cables to a control panel; the control panel is configured to manage the operation of the electrocoagulation unit and the water flow through the apparatus.

10. The apparatus of claim 1, wherein the electrocoagulation unit further comprises an ultrasonic located on a bottom half of the electrocoagulation unit, opposite to the inlet pipe.

11. The apparatus of claim 1, wherein the container frame further comprises a plurality of connectors at four corners of the container frame.

12. The apparatus of claim 1, wherein a sludge removal opening is located at a middle of the bottom of the electrocoagulation unit.

13. The apparatus of claim 2, wherein one of the discharge tray supports continues beyond the hopper casing and leads to an effluent tank while the other end is blocked by a rounded wall of the hopper casing; the effluent tank comprises an effluent outlet and a sediment disposal point on a sloped base.

14. The apparatus of claim 2, wherein a slotted tube is placed perpendicular to the discharge tray on the side closer to the electrocoagulation unit; the slotted tube is attached to the midpoint of the edge of the discharge tray with a blank side and is rotated along the axis of the conical filter arrangement.

15. The apparatus of claim 14, wherein the other end of the slotted tube is connected to an oil and scum discharge outlet; the oil and scum outlet is beyond the hopper casing in a corner of the container frame opposite to an effluent tank.

16. The apparatus of claim 14, wherein a half of the hopper casing is covered with a baffle plate to guide the flow of accumulated oil around the hopper casing towards the slotted tube.

17. The apparatus of claim 13, wherein the sediment disposal point is disposed on the sloped base of the effluent tank, configured for cleaning sediments.

18. The apparatus of claim 1, wherein the electrocoagulation unit further comprises hatches on top of the first electrode plate and the second electrode plate for easy replacement.

* * * * *